A. W. J. MASON.
Machine for Drying Sugar.
No. 28,189.
Patented May 8, 1860.
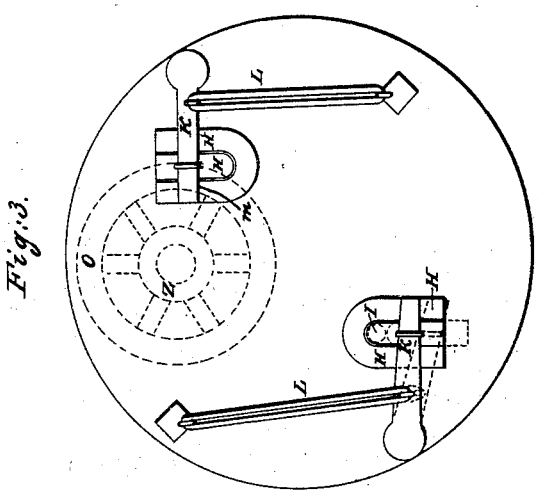
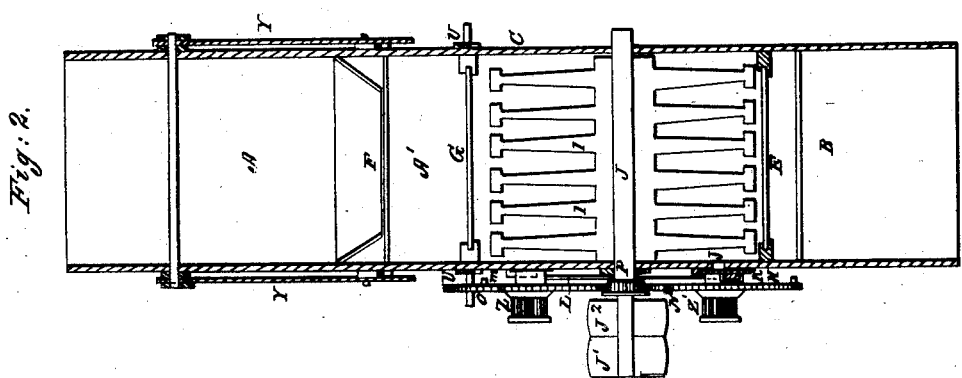
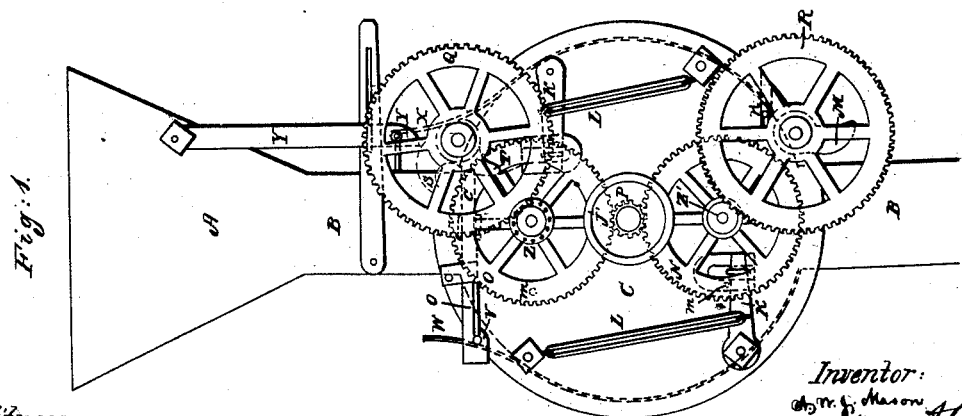

UNITED STATES PATENT OFFICE.

ALFRED WM. JNO. MASON, OF NEW ORLEANS, LOUISIANA.

MACHINE FOR DRYING SUGAR.

Specification of Letters Patent No. 28,189, dated May 8, 1860.

*To all whom it may concern:*

Be it known that I, ALFRED WILLIAM JOHN MASON, of New Orleans, in the county of Orleans and State of Louisiana, have invented a new and useful Improvement in Machines for Drying Sugar and other Substances; and I do hereby declare that the following is a full, clear, and exact description of the same, reference being had to the accompanying drawings, forming a part of this specification, in which—

Figure 1, represents a front view of the machine. Fig. 2, is a vertical cross section of it, and Fig. 3, an enlarged view of the ventilating valves.

Similar letters of reference in each of the several figures indicate corresponding parts.

The nature of my invention consists in combining a spout, drum and slides, with a revolving fan or beater and automatic ventilating valves, arranged as hereafter to be described, and for the purpose of drying sugar or other similar substances.

To enable others skilled in the art, to make and use my invention, I will proceed to describe its construction and operation.

The sugar to be dried is placed in a hopper A. As often as the hopper slide F, opens a portion of the sugar passes from the hopper into the receiving chamber A', and (on the opening of the distributing slide G) onto the revolving fan or beater D. The periodical opening of discharge slide E, allows the sugar to drop from drum C, through the lower end of spout B, out of the machine.

The air in the drum is (by employing steam or other suitable means) kept at a high temperature, such as required for drying the sugar while being agitated by the fan D.

Valves H, H, are arranged in the sides of the drum which are from time to time automatically opened (as will be afterwards described) for the purpose of admitting fresh air through valve holes I, in the side of the drum so as to ventilate the latter.

The fan consists of a number of slotted wings so placed in relation to each other, that the arms D, of one wing will correspond to the slots in the next wing, in order that the sugar as it falls from the arms of one wing, shall drop onto the arms of the next following wing, and so forth, so as to agitate the sugar in a most thorough manner. But besides agitating the sugar, this revolving fan answers also the purpose of beating the sugar as it falls onto its arms and thus breaking up the lumps into which damp sugar is apt to gather. This advantage is not obtained by agitating the sugar by means of an endless screw or any similar device, because there the sugar receives a regular and continuous motion without being thrown from one surface onto another. The fan is arranged upon shaft J, in the center of drum C, upon the outer end of which shaft there is the driving pulley $J^2$, and loose pulley $J'$. The pinion P, upon shaft J, takes into cog wheels O, N, and pinions Z, Z', upon the shafts of cog wheels O, N, take into cog wheels Q, R. Pins $m$, $m$, project from the rims of the cog wheels O, N, and each of these pins strikes, during each revolution of its cog wheel, the arm K, of one of the ventilating valves H, so as to depress the arm and with it the valve H, (the arm being pivoted at one end and hung to the valve at the other end and the valve being guided in a valve frame $H'$). As the valve H, opens, the valve opening I, is exposed (see position of parts represented by red lines in Fig. 3) and air admitted into the drum, for the purposes of ventilation as soon as the pin has passed the arm K, the latter (and with it the valve H,) is moved back into its original positions (represented by black lines in Fig. 3) by the action of india rubber spring L, and the valve opening is thus closed.

The discharge slide E, which moves in grooved ways, is periodically opened by the cam M, upon the shaft of cog wheel R, striking the pin $n$, upon the outer end of the slide, once during each revolution of the cog wheel. Cams S, T, upon the shaft of cog wheel Q, actuate the slides F, and G, in a similar manner, by striking the arms Y, V, (to which the slides F, $G'$, are respectively hung) once in a revolution of the cog wheel Q. The slides F, G, E, when left by the cogs which open them, are again closed by the action of suitable springs. Thus the hopper, distributing and discharge slides, and the ventilating slides, all work automatically and in combination with the fan or beater in the drying and ventilating drum.

What I claim as my invention and desire to secure by Letters Patent, is—

Combining a spout B, drum C, and slides F, G, E, with a revolving fan or beater D, and automatic ventilating valves H, H, substantially as and for the purposes set forth.

ALFRED W. J. MASON.

Witnesses:
G. A. SANFORD,
WARREN DAVIS.